United States Patent
Katsuzawa et al.

(10) Patent No.: US 6,940,192 B2
(45) Date of Patent: Sep. 6, 2005

(54) AIR-COOLED MOTOR

(75) Inventors: Yukio Katsuzawa, Yamanashi (JP);
Michi Masuya, Yamanshi (JP);
Yasuyuki Nakazawa, Fujiyoshida (JP);
Taku Oohara, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/643,872

(22) Filed: Aug. 20, 2003

(65) Prior Publication Data
US 2004/0036366 A1 Feb. 26, 2004

(30) Foreign Application Priority Data
Aug. 23, 2002 (JP) ........................................ 2002-244109

(51) Int. Cl.$^7$ ............................................... H02K 9/00
(52) U.S. Cl. ........................................... 310/58; 310/52
(58) Field of Search ........................ 310/52, 54, 58, 310/64

(56) References Cited

U.S. PATENT DOCUMENTS

| | | | |
|---|---|---|---|
| 1,575,660 A | | 3/1926 | Teipel et al. |
| 4,152,612 A | * | 5/1979 | Endo ........................... 310/83 |
| 4,574,210 A | * | 3/1986 | Wieland ....................... 310/59 |
| 4,645,963 A | | 2/1987 | Plackner et al. |
| 5,019,733 A | * | 5/1991 | Kano et al. ................... 310/61 |
| 5,589,720 A | * | 12/1996 | Berger .......................... 310/61 |
| 5,994,804 A | * | 11/1999 | Grennan et al. ........... 310/60 R |
| 6,087,744 A | * | 7/2000 | Glauning ...................... 310/58 |
| 6,191,511 B1 | * | 2/2001 | Zysset ....................... 310/60 A |
| 6,727,609 B2 | * | 4/2004 | Johnsen ....................... 310/52 |

FOREIGN PATENT DOCUMENTS

| | | |
|---|---|---|
| EP | 0 878 896 | 11/1998 |
| EP | 0 924 026 | 6/1999 |
| JP | 61-62542 | 4/1986 |
| JP | 61-62544 | 4/1986 |
| JP | 62-19059 | 2/1987 |
| JP | 2-85093 | 7/1990 |
| JP | 2-197237 | 8/1990 |
| JP | 4-56988 | 5/1992 |
| JP | 53-24407 | 12/1993 |
| JP | 10-146021 | 5/1998 |

OTHER PUBLICATIONS

European Search Report dated Dec. 16, 2004 in European Appln. No. 03255108.7.
Patent Abstracts of Japan, Publication No. 2000087868, Published Mar. 28, 2000.

* cited by examiner

Primary Examiner—Darren Schuberg
Assistant Examiner—Hanh N. Nguyen
(74) Attorney, Agent, or Firm—Staas & Halsey LLP

(57) ABSTRACT

An air-cooled motor has a motor body in which a through hole is formed in a rotary shaft, a supply section for supplying a fluid to the through hole, a cylindrical member surrounding the supply section, and a cooling fan provided on the side opposite the motor body with respect to the cylindrical member. A window is provided in the cylindrical member or at least a part of the cylindrical member is made of a transparent material so that the supply section can be visually observed.

3 Claims, 4 Drawing Sheets

AIR-COOLED MOTOR

BACKGROUND OF THE INVENTION

1. Field of the Invention

The present invention relates to an air-cooled motor and, more particularly, to an air-cooled motor in which a through hole for passing a fluid is provided in a rotary shaft.

2. Description of the Prior Art

For driving the main shaft of a processing machine or the like, a motor in which a through hole is formed in the rotary shaft is widely used (for example, refer to Japanese Patent Application Laid-Open No. 10-146021). The motor of this type has a hole for passing a liquid or gas, which is formed so as to extend through the rotary shaft, and has a supply section using a rotary joint at the end of the shaft on the rear side of the motor in order to supply the liquid or gas into the through hole.

On the other hand, an air cooling type is often used to cool down the motor body. In this case, a structure commonly employed is that the exhaust direction of cooling air is set to the axial direction of the motor (the direction in which the rotary shaft extends), and the cooling fan is attached to the rear side of the motor. Therefore, the cooling air for cooling the motor body passes around the supply section in which the rotary joint is provided and reaches the cooling fan.

Consequently, if suction of outside air happens around the supply section, a loss occurs in suction force of the cooling fan so that the cooling efficiency of the motor body deteriorates. In order to prevent the deterioration, hitherto, a structure is generally employed such that the rotary joint is covered with a cylindrical member called a distance block and the cooling fan is attached to the rear end face of the cylindrical member.

In the conventional structure, however, since the rotary joint is covered with the cylindrical member, the rotary joint and its periphery cannot be seen from the outside. Therefore, if the rotary joint is broken, it is difficult to find such a breakage, and a leaked liquid or gas may be accumulated in the cylindrical member. When the cooling fan is attached to the motor side face so as not to interfere with the rotary joint, the cooling air is exhausted in the lateral direction and it causes a problem that a machine to which the exhaust air is blown is thermally displaced.

OBJECT AND SUMMARY OF THE INVENTION

An object of the invention is therefore to provide an air-cooled motor which solves the problems of the conventional technique and of which a supply section (rotary joint) to a through hole and the periphery of the supply section can be visually observed so that an abnormal state of the supply section (rotary joint), a liquid leakage, or the like can be found early.

The invention is applied to an air-cooled motor having: a motor body in which a through hole is formed in a rotary shaft; a supply section for supplying a fluid to the through hole; a cylindrical member surrounding the supply section; and a cooling fan provided on the side opposite the motor body with respect to the cylindrical member.

As an improvement according to the invention, a window is provided in the cylindrical member so that the supply section can be visually observed. At least a part of the cylindrical member may be made of a transparent material so that the supply section can be visually observed. Further, a passage for distributing cooling air toward the cooling fan may be provided in the cylindrical member.

In the case of making at least a part of the cylindrical member of the transparent material, the supply section can be visually observed without providing openings in the cylindrical member. Thus, the cylindrical member itself can be used as means for assuring a passage of cooling air in a manner similar to the conventional technique. On the other hand, in the case of providing a passage for distributing cooling air toward the cooling fan in the cylindrical member, even when an opening is formed in the cylindrical member for using it as a "window", there is no worry that the air cooling efficiency of the motor body deteriorates. Since the number of the openings increases, heat dissipation is promoted.

DETAILED DESCRIPTION OF THE PREFERRED EMBODIMENTS

Figure 1:
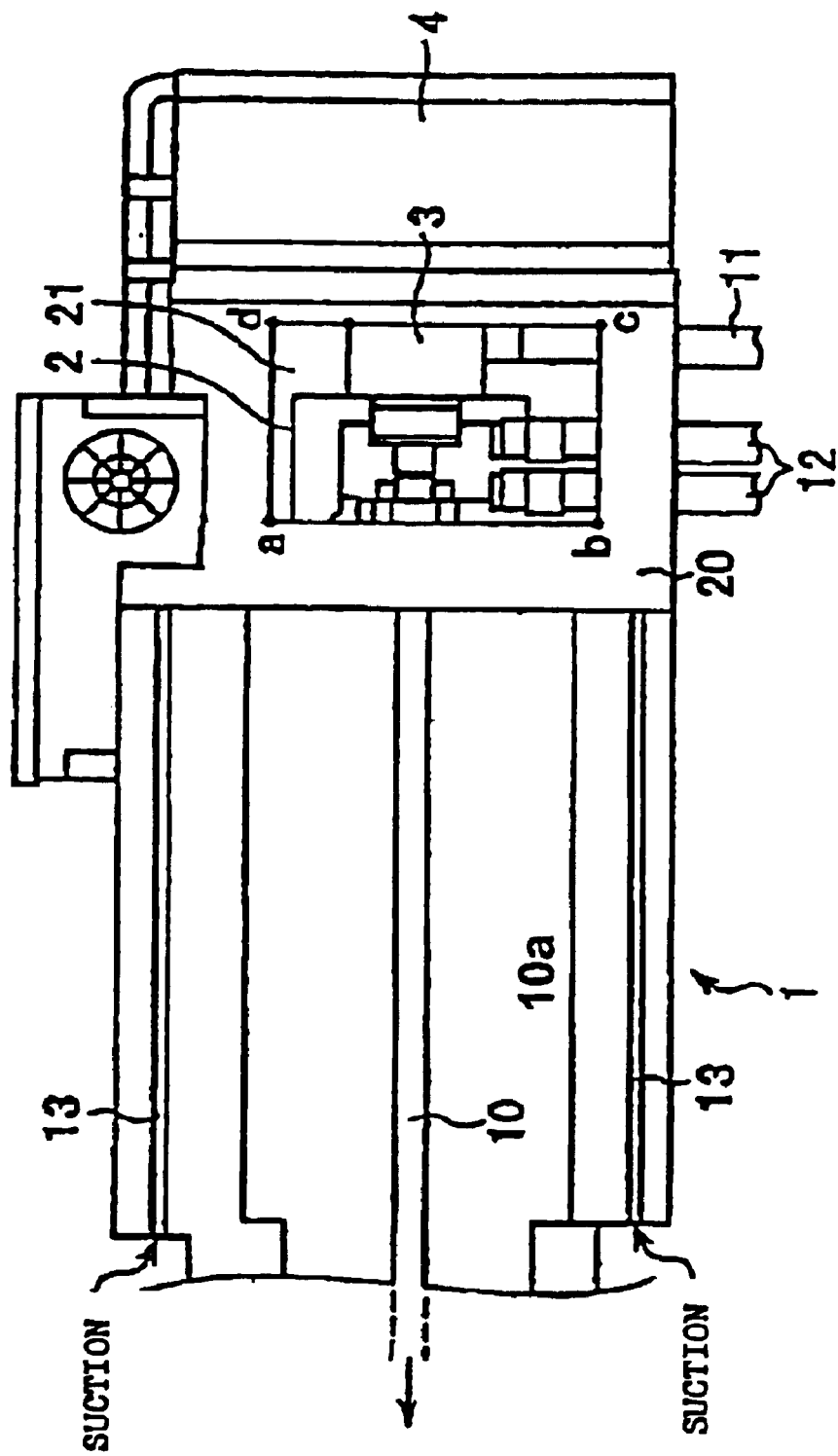
FIG. 1 is a cross section of main components of an air-cooled motor according to a first embodiment of the invention.

FIG. 1 is a cross section of the main components of an air-cooled motor according to a first embodiment of the invention. Referring to FIG. 1, reference numeral 1 denotes a motor body having a through hole 10 in a rotary shaft. On the rear side of the motor body 1, a rotary joint attachment housing 2 is provided, and a rotary joint 3 is attached to the rotary joint attachment housing 2. The rotary joint 3 constructs a fluid supply section for supplying a fluid (liquid or gas) from a stationary portion side to the through hole 10 formed in the rotary shaft. A hose (fluid feeding tube) 11 is connected to the rotary joint (fluid supply section) 3. Via the hose (fluid feeding tube) 11, fluid is fed to the rotary joint (fluid supply section) 3.

Although not shown, for example, the main shaft of a processing machine having a through hole on the same rotary axis as the through hole 10 is connected to the front end side of the rotary shaft of the motor via a joint, a processing tool with a through hole is attached to the front end of the main shaft, and the fluid fed via the rotary joint (fluid supply section) 3 into the through hole 10 passes through the through hole of the main shaft and the through hole of the processing tool and is sprayed to a process region of a workpiece to be processed. As it is known, the process region is cooled by the fluid, so that overheating is prevented, and also an efficient discharge of chips is performed.

On the other hand, to make heat generated by the motor itself escape, in addition to the through hole 10, some cooling air passages 13 are provided in proper places in the motor body 1 and a cooling fan 4 is disposed on the rear side of the rotary joint 3. The cooling air passages 13 are open to the outside in proper places in the front portion of the motor body 1 in order to take in the outside air.

In order to take the air efficiently by the suction of the cooling fan 4, the space around the fluid supply section (rotary joint) 3 interposed between the cooling fan 4 and the motor body 1 is surrounded by a cylindrical member 20 detachably attached to the rear end side of the motor body 1. The cylindrical member 20 is also called a distance block. In the embodiment, the cylindrical member (distance block) 20 itself provides a cooling air passage extending between the cooling fan 4 and the motor body 1.

In other words, without providing a portion for assuring the cooling air passage in the cylindrical member (distance block) 20, the flow from the cooling air passage 13, via the space around the fluid supply section (rotary joint) 3 surrounded by the cylindrical member 20, to the cooling fan 4 is assured by the operation of the cooling fan 4.

In addition to assurance of the supply of the fluid to the through hole 10 and the air-cooling of the motor as described above, in the embodiment, the portion around the rotary joint (fluid supply section) 3 can be easily visually observed from the outside, by forming a part of the cylindrical member (distance block) 20 by a transparent member 21. The transparent member 21 is made of, for example, transparent acrylic resin, glass, or the like and forms an observation window having four corners a, b, c, and d.

The transparent member 21 is provided so as to close the portion defined by the reference characters a, b, c, and without creating a gap, so that the outside air is not taken in through the observation window and the air cooling efficiency does not deteriorate. It is preferable to detachably attach the transparent member 21 to the cylindrical member (distance block) 20.

If breakage of the rotary joint (fluid supply section) 3, a liquid leakage caused by the breakage, or the like occurs by chance, the abnormal state can be easily found because of the existence of the observation window using the transparent member 21. Since a small amount of leakage occurs in the rotary joint 3 at the start of fluid flowing and immediately after the stop of the fluid flowing due to the structure of the rotary joint 3, a drain (discharge pipe) 12 for discharging the small amount of leaked fluid to the outside is attached to the rotary joint attachment housing 2.

When the leaked fluid is accumulated in the cylindrical member 20 when a large amount of fluid leaks due to breakage of the rotary joint 3, the operator immediately turns off the power of the motor, detaches the transparent member 21 and the cylindrical member 20 and discharges the accumulated fluid. The operator also takes necessary steps such as replacement of the broken rotary joint.

Although the window formed in the cylindrical member is closed with the transparent member in the embodiment as described above, the whole cylindrical member (distance block) 20 may be made of a transparent material.

Figure 2:
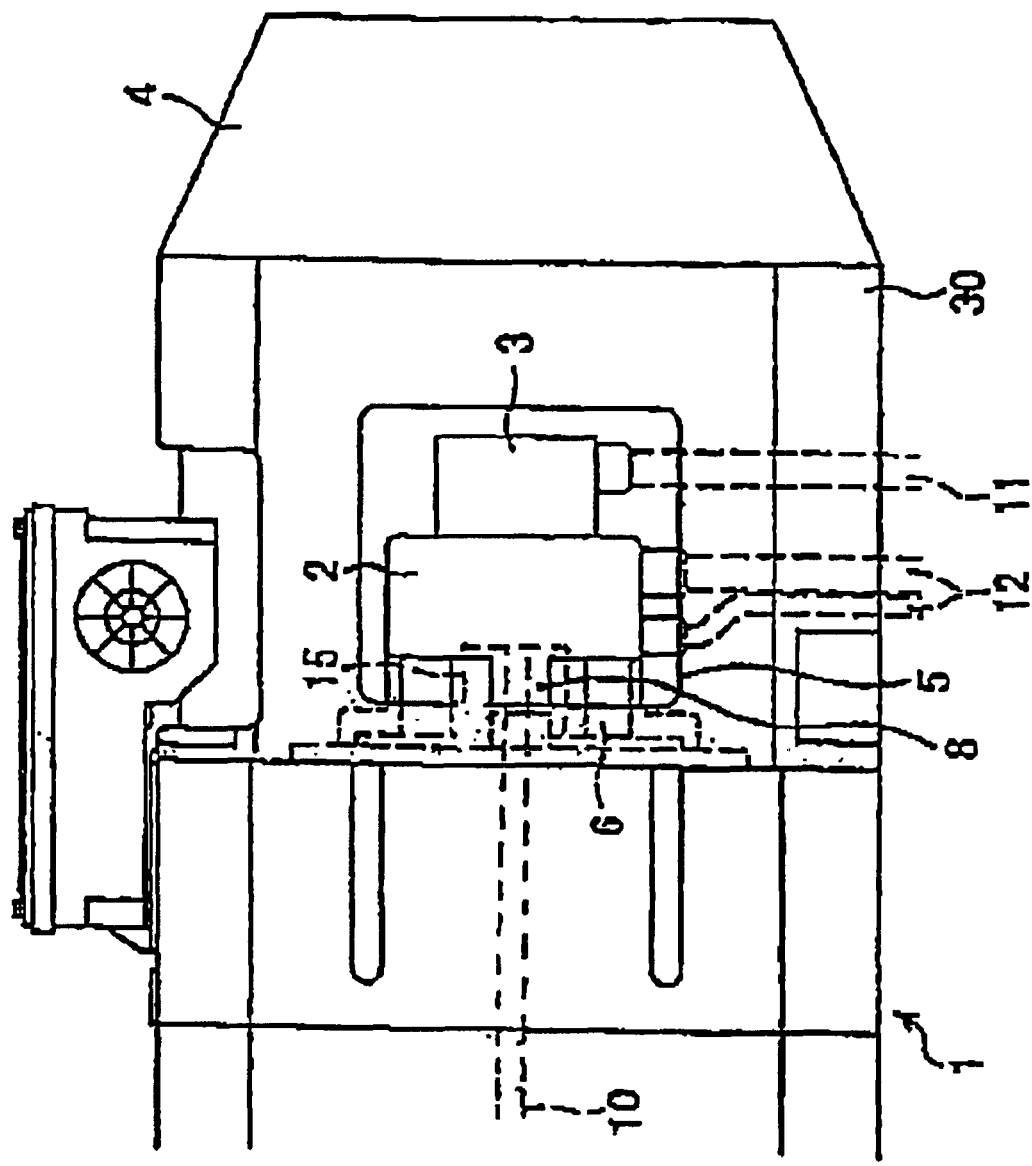
FIG. 2 is a diagram showing the structure of a rear portion of an air-cooled motor according to a second embodiment of the invention.
Figure 5:
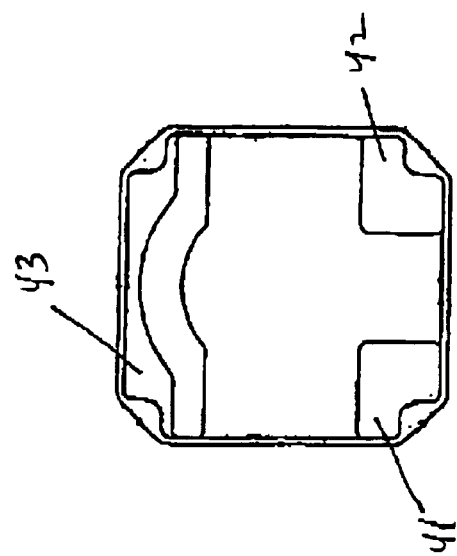
FIG. 5 is a cross section taken along line 5—5 of FIG. 3.
Figure 3:
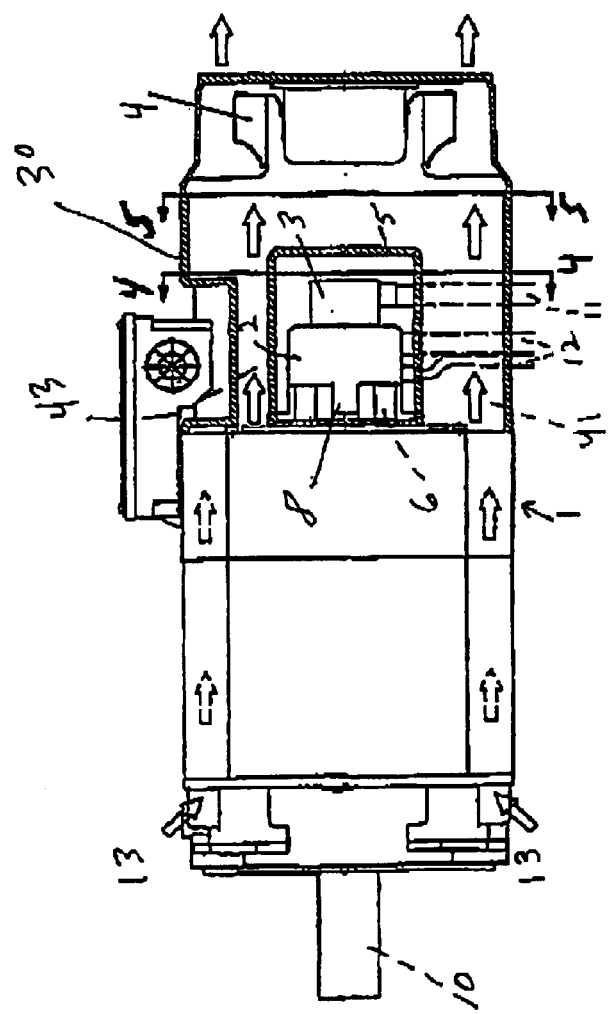
FIG. 3 is a side, partial cross-sectional view showing the air cooled motor according to the second embodiment.
Figure 4:
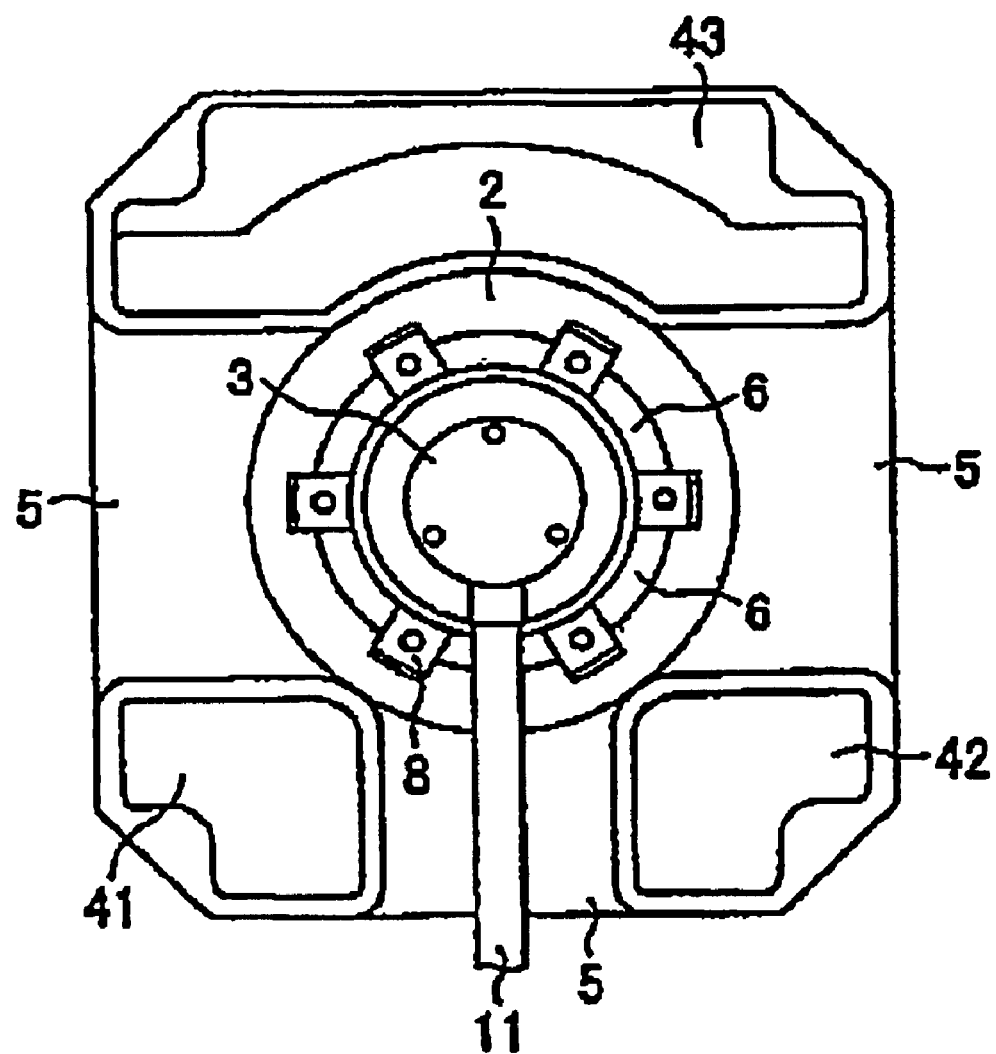
FIG. 4 is a cross section taken along line 4—4 of FIG. 3.

Further, the window in the cylindrical member may be used as an opening through which air can be ventilated. An example of the case of the opening will be described as another embodiment (second embodiment) with reference to FIGS. 2–5. FIG. 2 is a diagram showing a portion around the rear portion of the air-cooled motor according to the second embodiment. FIG. 3 shows a side, partial cross-sectional vise of the motor of the second embodiment. FIG. 4 is a cross section taken along 4, and FIG. 5 along line 5—5 of FIG. 2.

Referring to the diagrams, the rotary joint attachment housing 2 is provided on the rear side of the motor body 1 having the through hole 10 in the rotary shaft, and the rotary joint 3 is attached to the rotary joint attachment housing 2. Reference numeral 8 denotes legs of the rotary joint attachment housing 2 and, by using the legs 8, the rotary joint attachment housing 2 is attached to the rear portion of the motor body 1. Reference numeral 6 denotes openings (notches) formed in plural portions in the rotary joint attachment housing 2, as described later. When a fluid leakage occurs due to breakage or the like of the rotary joint 3, the openings 6 provide an escape of a leaked fluid.

In a manner similar to the case of the foregoing embodiment, the rotary joint 3 constitutes the fluid supply section for supplying a fluid (liquid or gas) from the stationary portion side to the through hole 10 formed through the rotary shaft. The hose (fluid feeding tube) 11 is connected to the rotary joint (fluid supply section) 3, and the fluid is fed into the rotary joint (fluid supply section) 3 via the hose (fluid feeding tube) 11. In FIG. 2, the rear end of the rotary shaft having the through hole 10 is shown by reference numeral 15.

Although not shown, the main shaft of a processing machine having a through hole which is coaxial with the through hole 10 is connected via a joint to the front end side of the rotary shaft of the motor. A processing tool with a through hole is attached to the front end of the main shaft, and the fluid fed into the through hole 10 via the rotary joint (fluid supply section) 3 passes through the through hole in the main shaft and the through hole in the processing tool and is sprayed to the process region in the workpiece to be processed. The process region is cooled down by the fluid, so that overheating is prevented, and also an efficient discharge of chips is performed.

On the other hand, to make heat generated by the motor itself escape, other than the through hole 10, some cooling air passages are provided in proper places in the motor body 1 and the cooling fan 4 is disposed on the rear side of the rotary joint 3. The cooling air passages in the motor body 1 are open to the outside in proper places in the front part of the motor body 1 to take in the outside air. Since the cooling air passages provided in the motor body 1 are similar to those in the foregoing embodiment described with reference to FIG. 1, the detailed description will not be repeated and the cooling air passages are not shown here.

The space around the fluid supply section (rotary joint) 3 interposed between the cooling fan 4 and the motor body 1 is surrounded by a cylindrical member 30 detachably attached to the rear end side of the motor body 1. The cylindrical member 30 has, different from the cylindrical member 20 used in the foregoing embodiment (FIG. 1), windows 5 opened to the sides with respect to the axial direction of the motor (extending direction of the rotary shaft) in some places.

Since air can be ventilated via the windows 5, it is not appropriate to use the cylindrical member (distance block) 30 as the cooling air passage between the cooling fan 4 and the motor body 1. In the second embodiment, therefore, cooling air passages 41, 42, and 43 are integrally provided on the inside of the cylindrical member (distance block) 30 so that they are used as a cooling air passage portion. The cooling air passage portion for assuring the cooling air passage may be formed by a member (pipe) which is different from the cylindrical member 30.

In either case, by assuring the cooling air passage, when the cooling fan 4 operates, the flow from the cooling air passage (not shown) in the motor body 1 via the cooling air passages 41, 42, and 43 to the cooling fan 4 is created and the air-cooling action of the motor is maintained.

In the second embodiment as well, in addition to assurance of both the supply of the fluid to the through hole 10 and the air-cooling of the motor, the portion around the rotary joint (fluid supply section) 3 can be easily visually observed from the outside.

If breakage of the rotary joint (fluid supply section) 3, a liquid leakage caused by the breakage, and the like occur by chance, the abnormal state can be easily found because of the existence of the window 5. As described above, since a small amount of fluid leaks in the rotary joint 3 even in the normal state, the drain (discharge pipe) 12 for discharging the leaked fluid to the outside is attached to the rotary joint attachment housing 2.

When a large amount of fluid leakage occurs due to breakage of the rotary joint 3, as described above, the fluid passes through the openings (notches) 6 formed in some places in the rotary joint attachment housing 2 and the opened windows 5 through which air can be ventilated and flows to the outside.

According to the present invention, in the air-cooled motor in which the through hole for passing fluid is formed in the rotary shaft, the structure such that the fluid supply section (rotary joint) to the through hole and its periphery can be visually observed is provided while assuring the passage of the cooling air for air-cooling. It facilitates early finding of an abnormal state of the fluid supply section using a rotary joint, a fluid leakage, and the like.

What is claimed is:

1. An air-cooled motor comprising:
    a motor body in which a through hole is formed in a rotary shaft;
    a supply section supplying a cooling liquid to the through hole;
    a cylindrical member surrounding the supply section; and
    a cooling fan provided on a side opposite the motor body with respect to the cylindrical member,
    wherein a plurality of cooling air passage portions is isolated from the supply section, is integrally provided on the inside of the cylindrical member to extend toward the cooling fan, is arranged to surround the supply section, and prevents cooling air from leaking from the cylindrical member; and
    wherein said plurality of air passage portions is arranged with a space between each, so that at least one open window allowing a visual observation from outside the motor into the motor is formed in the cylindrical member in the space.

2. The air-cooled motor according to claim 1, wherein said plurality of cooling air passage portions is formed separately from the cylindrical member.

3. The air-cooled motor according to claim 1, wherein each passage portion includes a walled channel within the cylindrical member that creates an air space separate from an air space in the cylindrical member.

* * * * *

UNITED STATES PATENT AND TRADEMARK OFFICE
CERTIFICATE OF CORRECTION

PATENT NO. : 6,940,192 B2  Page 1 of 1
APPLICATION NO. : 10/643872
DATED : September 6, 2005
INVENTOR(S) : Yukio Katsuzawa et al.

It is certified that error appears in the above-identified patent and that said Letters Patent is hereby corrected as shown below:

On Title Page, column 1, (75) Inventors: delete "Yamanshi" and insert --Yamanashi--

On Title Page, column 2, FOREIGN PATENT DOCUMENTS after 5/1998 insert --HO2K/9/06-- column 2, line 30 delete "shaft" and insert --shaft 10a-- column 3, line 22 after "and" insert --d-- column 3, line 57 delete "4," and insert --line 4-4,--

Signed and Sealed this

Fifteenth Day of August, 2006

JON W. DUDAS
*Director of the United States Patent and Trademark Office*